United States Patent
Lee et al.

(10) Patent No.: US 8,046,035 B2
(45) Date of Patent: *Oct. 25, 2011

(54) SLIDE TYPE MOBILE TERMINAL INCLUDING A PLURALITY OF PUSH PROTRUSION

(75) Inventors: Ul-Ho Lee, Seongnam-si (KR); Yong-Jae Kim, Seongnam-si (KR)

(73) Assignee: KT Tech, Inc., Gyeonggi-do (KR)

( * ) Notice: Subject to any disclaimer, the term of this patent is extended or adjusted under 35 U.S.C. 154(b) by 825 days.

This patent is subject to a terminal disclaimer.

(21) Appl. No.: 11/991,545

(22) PCT Filed: Dec. 20, 2005

(86) PCT No.: PCT/KR2005/004397
§ 371 (c)(1),
(2), (4) Date: Mar. 6, 2008

(87) PCT Pub. No.: WO2007/029904
PCT Pub. Date: Mar. 15, 2007

(65) Prior Publication Data
US 2009/0227300 A1    Sep. 10, 2009

(30) Foreign Application Priority Data
Sep. 7, 2005  (KR) .................. 10-2005-0083174

(51) Int. Cl.
*H04M 1/00* (2006.01)
(52) U.S. Cl. ............ 455/575.4; 455/566; 361/679.11; 345/168; 345/169; 345/172
(58) Field of Classification Search .... 455/575.1–575.4, 455/556.2, 566; 16/50, 68; 361/679.08–679.09, 361/679.11, 679.14–679.17; 345/168, 169
See application file for complete search history.

(56) References Cited

U.S. PATENT DOCUMENTS
7,363,066 B2 *  4/2008  Im et al. .................. 455/575.4
(Continued)

FOREIGN PATENT DOCUMENTS
CN         1500312         5/2004
(Continued)

OTHER PUBLICATIONS

Chinese Office Action dated Mar. 19, 2010 for corresponding Chinese Application No. 200580051518.7 and partial English translation thereof, pp. 1-6.

(Continued)

*Primary Examiner* — Rafael Pérez-Gutiérrez
*Assistant Examiner* — Thai Vu
(74) *Attorney, Agent, or Firm* — Harness, Dickey & Pierce, P.L.C.

(57) ABSTRACT

A slide type mobile terminal according to an aspect of the invention comprises: a main body having buttons and a slide part having a display, wherein the buttons comprise at least one open button that is open to the exterior and at least one hidden button that is not open to the exterior when the slide part is opened with respect to the main body, the slide part comprises at least one push protrusion corresponding with at least the hidden button, and the main body and the slide part are joined by a connection means which allows sliding of the slide part with respect to the main body. With such a composition, the invention allows for a larger display on the slide part and provides a slide type mobile terminal which can have various functional buttons.

9 Claims, 6 Drawing Sheets

U.S. PATENT DOCUMENTS

| | | | |
|---|---|---|---|
| 7,382,695 B2 * | 6/2008 | Matsui | 368/69 |
| 7,672,700 B2 * | 3/2010 | Oda | 455/575.4 |
| 2004/0248621 A1 | 12/2004 | Schon | |
| 2005/0009572 A1 * | 1/2005 | Ahn et al. | 455/566 |

FOREIGN PATENT DOCUMENTS

| | | |
|---|---|---|
| CN | 1503541 | 6/2004 |
| KR | 2004-012329 | 2/2004 |
| KR | 2005-100257 | 10/2005 |
| KR | 2005-104056 | 11/2005 |
| WO | WO 2005/009010 | 1/2005 |

OTHER PUBLICATIONS

European Search Report dated Oct. 23, 2009 for corresponding European Application No. 05822032.8.

* cited by examiner

SLIDE TYPE MOBILE TERMINAL INCLUDING A PLURALITY OF PUSH PROTRUSION

TECHNICAL FIELD

This document relates to a slide type mobile terminal.

BACKGROUND ART

As wireless communication technology has been developed day by day, it is applied to various products and gives convenience to manifold aspects. Such wireless communication technology is applied to the phone, so that users can carry and use it anywhere. Generally, a mobile phone involves a comprehensive concept of a transmitter-receiver of household wireless phones, as well as a cellular phone, currently under wide use.

The mobile terminal can be classified into a flip type, a folder type, or a slide type according to the shape or operation method. The slide type mobile terminal has two sliding parts which are overlapped and of which one has a display and the other has buttons directed in the same direction. Generally, the slide type mobile terminal can slide the front sliding part relatively to expose a display part or buttons covered by it. In one example, there is a mobile terminal which can expose buttons formed on the front surface of the back sliding part when the front sliding part slides upward. In another example, there is a mobile terminal which can expose a display part formed on the front surface of the back sliding part when the front sliding part having buttons slides downward. Such slide type terminals are widely used due to the convenience in opening the display part.

The demand for terminals having wider screens is increasing as mobile terminals such as cellular phones, PDAs, portable computers, etc. are being equipped with cameras or camcorders. In particular, since mobile terminals which utilize digital multimedia broadcasting would be used for long periods, such demands are still more increased.

DISCLOSURE OF INVENTION

Technical Problem

The present invention is to provide a slide type mobile terminal which can provide not only bigger display but also greater convenience in operation.

The present invention is also to provide a slide type mobile terminal which can have various functional buttons.

Technical Solution

A slide type mobile terminal according to an aspect of the invention comprises: a main body having buttons and a slide part having a display, wherein the buttons comprise at least one open button that is open to the exterior and at least one hidden button that is not open to the exterior when the slide part is opened with respect to the main body, the slide part comprises at least one push protrusion corresponding with at least the hidden button, and the main body and the slide part are joined by a connection means which allows sliding of the slide part with respect to the main body.

The push protrusions may comprise a first protrusion and a second protrusion corresponding respectively to the open button and the hidden button when the slide part is closed with respect to the main body.

Also, the hidden buttons may comprise a first hidden button and a second hidden button, and the push protrusions may comprise a second protrusion and a third protrusion corresponding respectively to the first hidden button and the second hidden button, and a first protrusion corresponding with the open button, when the slide part is closed with respect to the main body.

The open buttons may comprise a first open button and a second open button, and the push protrusions may comprise a first protrusion and a fourth protrusion corresponding respectively to the first open button and the second open button, and a second protrusion corresponding with the hidden button, when the slide part is closed with respect to the main body.

Preferably, the first push protrusion corresponds with the hidden button when the slide part is open with respect to the main body. Also, when the slide part is open with respect to the main body, the first push protrusion should correspond with the first hidden button or the second hidden button.

Preferably, the first push protrusion corresponds with the second open button when the slide part is open with respect to the main body.

The open button may have different functions depending on whether the slide part is open or closed with respect to the main body.

The hidden button may have different functions depending on whether the slide part is open or closed with respect to the main body.

The connection means may comprise at least one slide groove formed on one of the main body and the slide part, and at least one slide guide formed on the other of the main body and the slide part and inserted into the slide groove.

Also, the connection means may comprise a first hinge part joined to one of the main body and the slide part, and a second hinge part joined to the other of the main body and the slide part and inserted slidably into the first hinge part.

The first hinge part may be joined to the back face of the slide part, and the second hinge part may be joined to the main body; the push protrusions may comprise a first protrusion and a second protrusion positioned on a face of the first hinge part; and the first push protrusion and the second push protrusion may correspond respectively to the open button and the hidden button when the slide part is closed with respect to the main body.

BEST MODE FOR CARRYING OUT THE INVENTION

Hereinafter, preferred embodiments of the slide type mobile terminal according to the invention will be described in more detail with reference to the accompanying drawings. In the description with reference to the accompanying drawings, those components are rendered the same reference number that are the same or are in correspondence regardless of the figure number, and redundant explanations are omitted.

Figure 1:
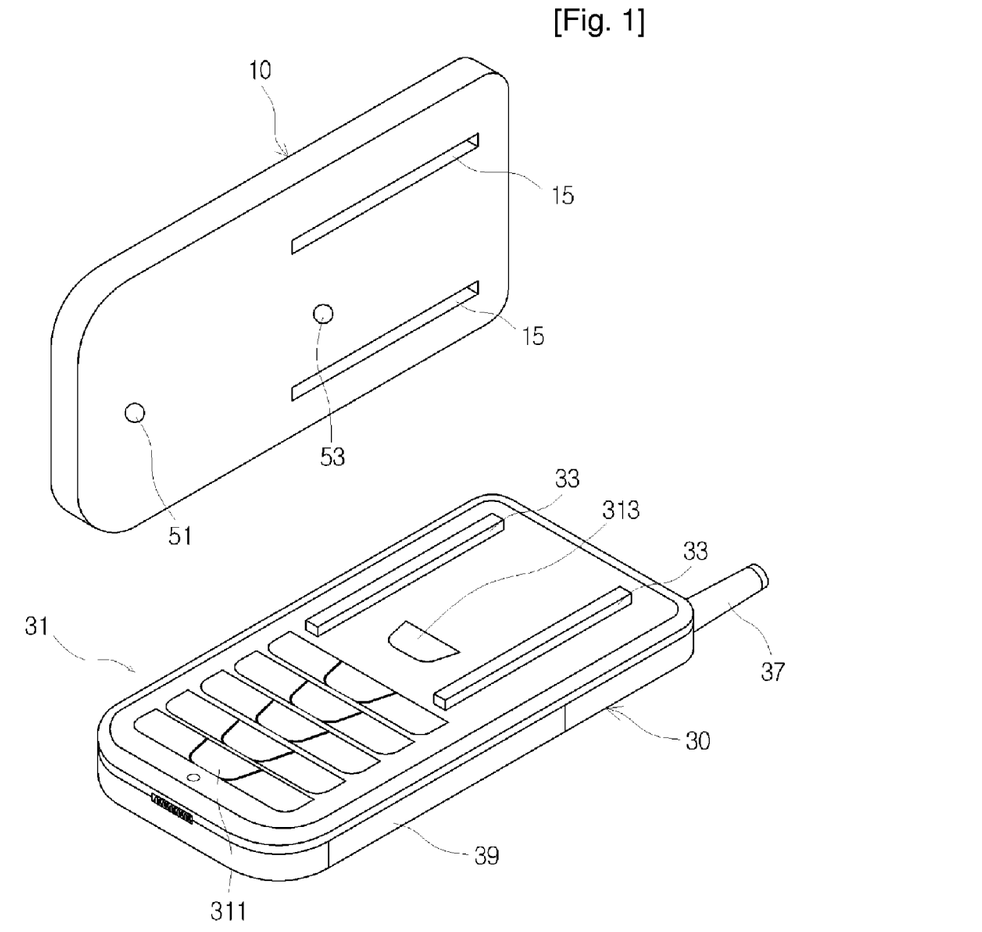
FIG. 1 is an exploded view of a slide type mobile terminal according to an embodiment of the present invention.

FIG. 1 is an exploded view of a slide type mobile terminal according to an embodiment of the present invention.

A slide type mobile terminal according to an embodiment of the present invention, as illustrated in FIG. 1, comprises a slide part 10 having a display (not shown), a main body 30 having buttons 31 and joined to the slide part 10, and push protrusions 51, 53 formed on the lower surface of the slide part 10. The buttons 31 comprise an open button 311 and a hidden button 313.

On one surface of the slide part 10, although not shown, is formed a display 11, and on the other surface are formed push protrusions 51, 53 and slide grooves 15. The slide part 10 is joined slidably to the upper surface of the main body 30 and can be displaced a predetermined distance by the slide grooves 15 and the slide guides 33.

The slide guides 33 formed on the upper surface of the main body 30 are inserted into the slide grooves 15. The slide grooves 15 and the slide guides 33 allow sliding motion of the slide part 10. Accordingly, the slide part 10 moves up and down so that it can expose or cover the open button 311. The slide grooves 15 may be formed on one surface of the main body 30, in which case the slide guides 33 would be formed on the slide part 10.

The slide grooves 15 and the slide guides 33 are made from plastic resin or light metals, so the elasticity of the plastic resin or the light metals allows the displacement of the slide part 10. In addition, a buffer made from injection-molded plastic, etc., is positioned at the joining area between the slide grooves 15 and the slide guides 33, and this buffer may also allow displacement of the slide part 10.

Figure 2:
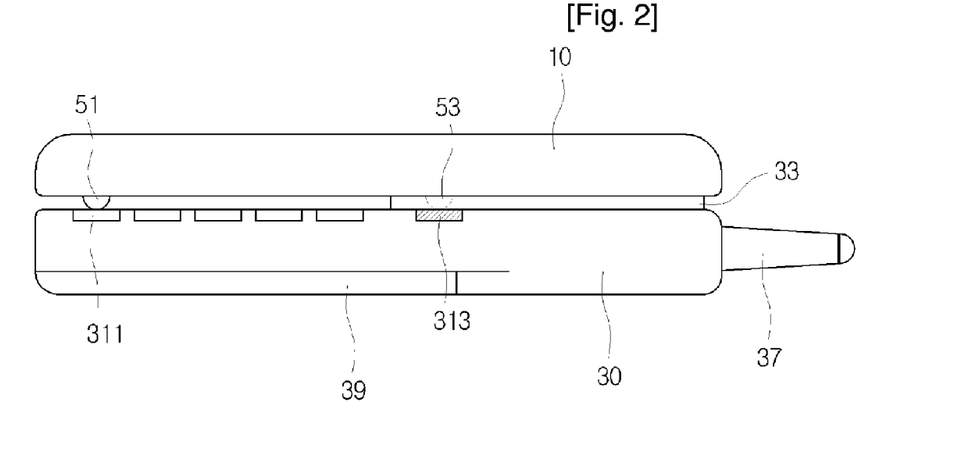
FIG. 2 is a schematic drawing illustrating a lower push protrusion and an upper push protrusion corresponding with an open button and a hidden button, when the slide part is closed with respect to the main body in the slide type mobile terminal of FIG. 1.

The push protrusions 51, 53 comprise an upper push protrusion 53 and a lower push protrusion 51, where the upper push protrusion 53 is positioned in the middle area of the slide part 10 and the lower push protrusion 51 is positioned in the lower area of the slide part 10. The upper push protrusion 53 and the lower push protrusion 51, as illustrated in FIG. 2, correspond respectively with the open button 311 and the hidden button 313 when the slide part 10 is closed with respect to the main body 30. Thus, the vertical distance between the upper push protrusion 53 and the lower push protrusion 51 is equal to the distance between the open button 311 and the hidden button 313.

When pressure is applied while the slide part 10 is closed, the lower and upper push protrusion 51, 53 move due to the displacement of the slide part 10 and apply pressure on the open button 311 or the hidden button 313, so that a function of the button 31 or the hidden button 313 is executed. Also, even when the slide part 10 is open with respect to the main body, the lower push protrusion 51 applies pressure on the hidden button 313 so that the function of the hidden button 313 may be executed.

Thus, with a slide type mobile terminal according to the present embodiment, if a portion of the slide part 10 is pressed while the slide part 10 is closed, the open button 311 or the hidden button 313, on which pressure is applied by the lower and upper push protrusions 51, 53, performs the role of function keys, and obsoletes function keys disposed on the upper surface of the slide part 10. As a result, it is possible to make a bigger display on the surface of the slide part 10. Furthermore, it becomes convenient to use the mobile terminal, and various function keys may be provided, because particular functions of the terminal can be executed by the mere push of the lower or middle portion of the slide part 10 while the slide part 10 is closed.

On the front surface of the main body 30 are positioned buttons 31 comprising an open button 31, which is exposed to the exterior when the slide part 10 slides upward, and a hidden button 313, which is not exposed to the exterior, slide guides 33 formed on one side of the main body 30, an antenna 37, and a battery 39.

The buttons 31 comprise an open button 311, which is made open when the slide part 10 is raised, and a hidden button 313 positioned between the slide guides 33.

Figure 3:
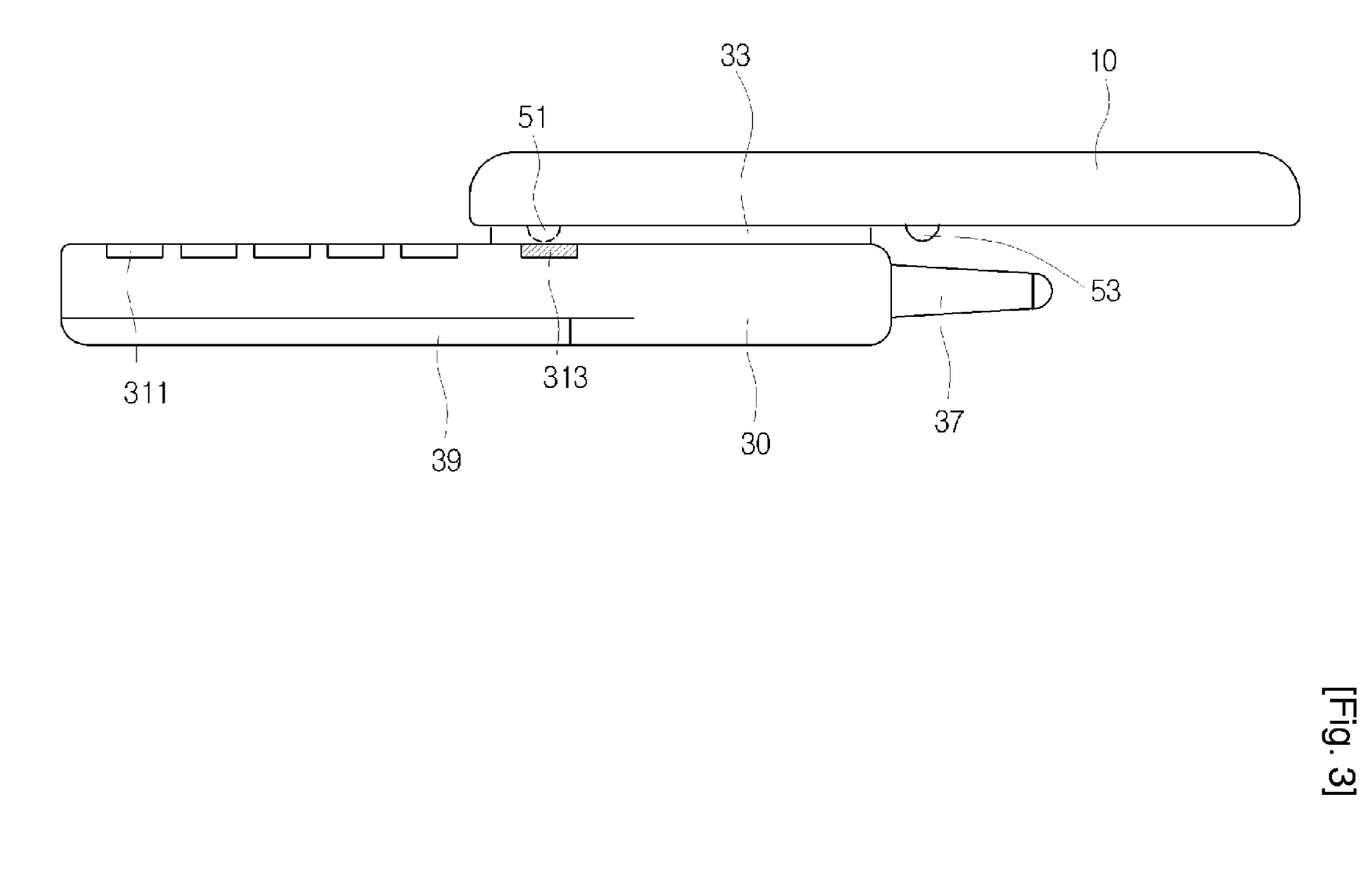
FIG. 3 is a schematic drawing illustrating the lower push protrusion corresponding with the hidden button, as the slide part is opened with respect to the main body in the slide type mobile terminal of FIG. 1.

When the slide part 10 is raised, the entirety of the open button 311 is exposed as in FIG. 3, and when the slide part 10 is closed with respect to the main body 30, the entirety of the open button 311 is covered by the slide part 10 as in FIG. 2.

The hidden button 313 in its entirety is always covered by the slide part 10, and contacts the lower push protrusion 51, when the slide part is closed, and the upper push protrusion 53, when the slide part is open. Pressure is applied on the hidden button 313, when the slide part 10 is displaced, by the upper or lower push protrusion 51, 53 to execute a particular function. For example, such functions as the play function of audio files or the play function of video media may be executed. The hidden button 313 itself may execute different functions depending on whether the slide part is open or closed.

The open button 311 may execute different functions depending on whether the slide part 10 is open or closed. For example, the open button 311 may execute the "0" function when the slide part 10 is open, and execute a function such as the play function of video media when the slide part 10 is closed.

The slide guides 33 are formed on the upper surface of the main body 30, and the slide grooves 15 are inserted to allow up and down motion of the slide part 10. Also, the slide guides 33 join the slide grooves 15 to allow the displacement of the slide part 10.

FIG. 2 is a schematic drawing illustrating the lower push protrusion 51 and the upper push protrusion 53 corresponding with the open button 311 and the hidden button 313, when the slide part 10 is closed with respect to the main body 30 in the slide type mobile terminal of FIG. 1, and FIG. 3 is a schematic drawing illustrating the lower push protrusion 51 corresponding with the hidden button 313, as the slide part 10 is opened with respect to the main body 30 in the slide type mobile terminal of FIG. 1.

When the slide part 10 is closed with respect to the main body 30, as shown in FIG. 2, the lower push protrusion 51 is above the open button 311 or is in contact with the open button 311. Then, when pressure is applied on the lower end of the slide part 10, the slide part 10 is displaced by the offset provided by the slide grooves 15 and the slide guides 33, so that the lower push protrusion 51 applies pressure on the open button 311. Also, when pressure is applied on the middle portion of the slide part 10, the slide part 10 is displaced so that the upper push protrusion 53 applies pressure on the hidden button 313.

When the slide part 10 is open with respect to the main body 30, as shown in FIG. 3, the lower push protrusion 51 is in contact with the hidden button 313 or is above the hidden button 313. Here, pressing the lower end of the slide part makes the lower push protrusion 51 apply pressure on the hidden button 313, so that the function of the hidden button 313 is executed.

Figure 4:
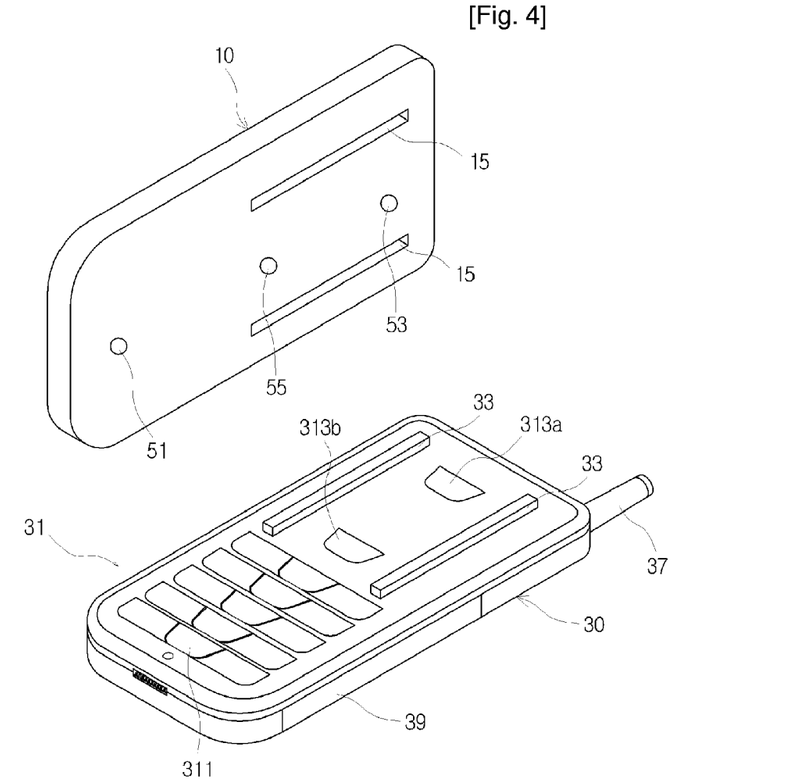
FIG. 4 is an exploded perspective view of a slide type mobile terminal according to another embodiment of the present invention.
Figure 5:
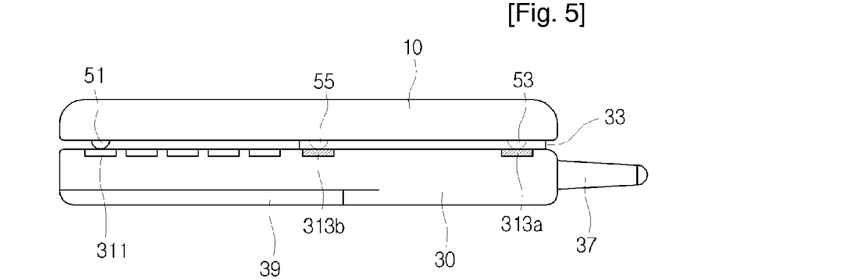
FIG. 5 is a schematic drawing illustrating a lower push protrusion, a middle push protrusion, and an upper push protrusion corresponding with an open button, a lower hidden button, and an upper hidden button, when the slide part is closed with respect to the main body in the slide type mobile terminal of FIG. 4.

FIG. 4 is an exploded perspective view of a slide type mobile terminal according to another embodiment of the present invention. FIG. 5 is a schematic drawing illustrating a lower push protrusion 51, a middle push protrusion 55, and an upper push protrusion 53 corresponding with an open button 311, a lower hidden button 313b, and an upper hidden button 313a, when the slide part 10 is closed with respect to the main body 30 in the slide type mobile terminal of FIG. 4, and FIG. 6 is a schematic drawing illustrating the lower push protrusion 51 and the middle push protrusion 55 corresponding with the lower hidden button 313b and the upper hidden button 313a, as the slide part 10 is opened with respect to the main body 30.

On the back face of the slide part 10 are formed the lower push protrusion 51, middle push protrusion 55 and upper push protrusion 53 in equal or substantially equal intervals. On the top face of the main body 30, as shown in FIG. 5, are positioned the open button 311, the lower hidden button 313b, and the upper hidden button 313a, corresponding respectively to the push protrusions 51, 55, 53. Thus, when the slide part 10 is closed with respect to the main body 30, applying pressure on the lower end of the slide part 10 makes the lower push protrusion 51 apply pressure on the open button 311 to execute function A. Also, pressing the middle portion of the slide part 10 makes the three push protrusions 51, 53, 55 apply pressure on the hidden buttons 313a, 313b and open button 311 simultaneously to execute function B. Further, when pressure is applied on the top portion of the slide part 10, the upper push protrusion 53 applies pressure on the upper hidden button 313a so that function C of the upper hidden button 313a is executed.

Figure 6:
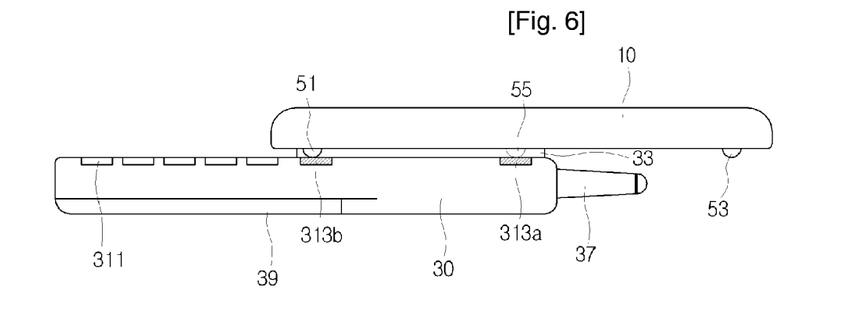
FIG. 6 is a schematic drawing illustrating the lower push protrusion and the middle push protrusion corresponding with the lower hidden button and the upper hidden button, as the slide part is opened with respect to the main body in the slide type mobile terminal of FIG. 4.

Also, as shown in FIG. 6, when the slide part 10 is open, applying pressure on the lower end of the slide part 10 may make the lower push protrusion 51 apply pressure on the lower hidden button 313b to execute function B, and applying pressure on the middle portion makes the middle push protrusion 55 apply pressure on the upper hidden button 313a to execute function C.

The functions A to C may be varied. For example, the function A may be to lower the volume, function B to play a video medium, and the function C may be to increase the volume, although they are not limited to the above. Not only the open button 311 but also the hidden button 313 may have various functions depending on whether the slide part 10 is open or closed. For example, the hidden buttons 313a, 313b may provide play and stop functions for an audio file when the slide part 10 is closed and provide phone number search and phone call functions when the slide part 10 is open. Of course, the invention is not limited to the above, and various functions for the open button and hidden button may be provided as necessary.

Figure 7:
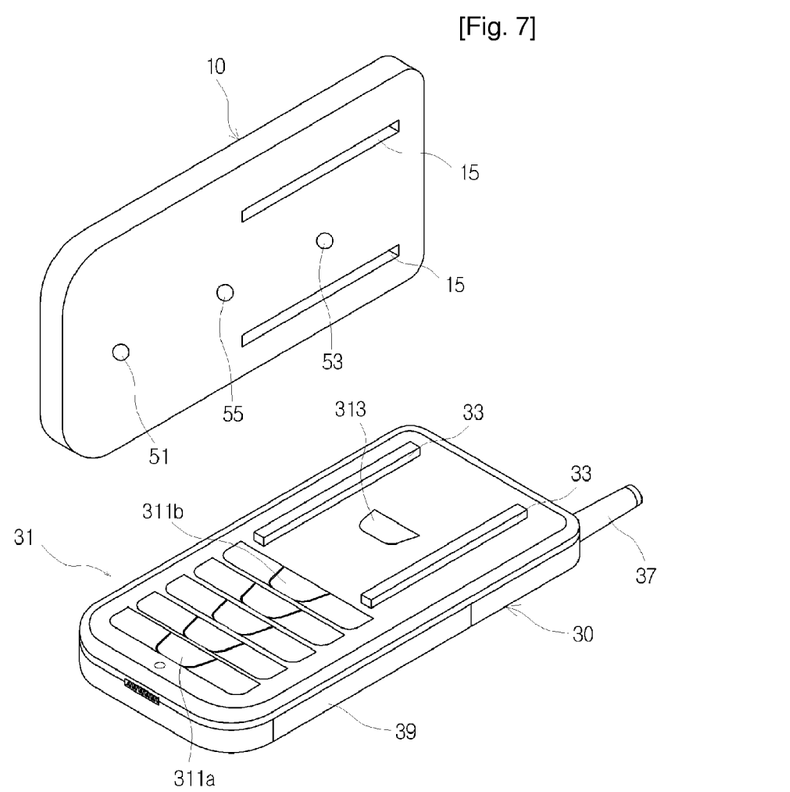
FIG. 7 is an exploded perspective view of a slide type mobile terminal according to still another embodiment of the present invention.
Figure 8:
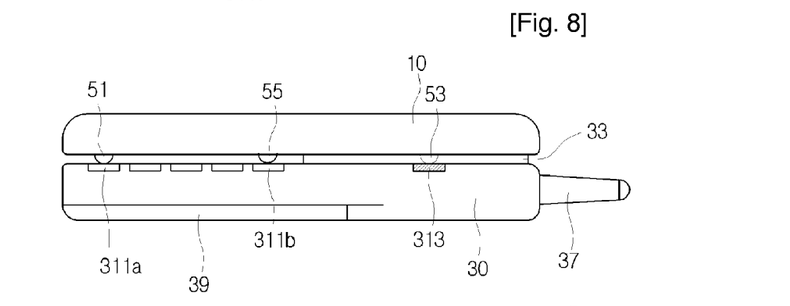
FIG. 8 is a schematic drawing illustrating a lower push protrusion, a middle push protrusion, and an upper push protrusion corresponding with a first open button, a second open button, and a hidden button, when the slide part is closed with respect to the main body in the slide type mobile terminal of FIG. 7.

FIG. 7 is an exploded perspective view of a slide type mobile terminal according to still another embodiment of the present invention. FIG. 8 is a schematic drawing illustrating a lower push protrusion 51, a middle push protrusion 55, and an upper push protrusion 53 corresponding with a first open button 311a, a second open button 311b, and a hidden button 313, when the slide part 10 is closed with respect to the main body 30 in the slide type mobile terminal of FIG. 7, and FIG. 9 is a schematic drawing illustrating the lower push protrusion 51 and the middle push protrusion 55 corresponding with the second open button 311b and the hidden button 313, as the slide part 10 is opened with respect to the main body 30 in the slide type mobile terminal of FIG. 7.

The lower push protrusion 51, middle push protrusion 55 and upper push protrusion 53 are placed on the back face of the slide part 10 in equal or almost equal intervals, and as shown in FIG. 8, correspond respectively with the first open button 311a, second open button 311b and hidden button 313 when the slide part 10 is closed. Thus, applying pressure on the lower end of the slide part 10 makes the lower push protrusion 51 apply pressure on the first open button 311a to execute function A. Also, pressing the middle portion of the slide part 10 makes the three push protrusions 51, 53, 55 apply pressure on the open buttons 311a, 311b and the hidden button 313 simultaneously to execute function B. Further, when pressure is applied on the top portion of the slide part 10, the upper push protrusion 53 applies pressure on the upper hidden button 313 so that function C is executed.

Figure 9:
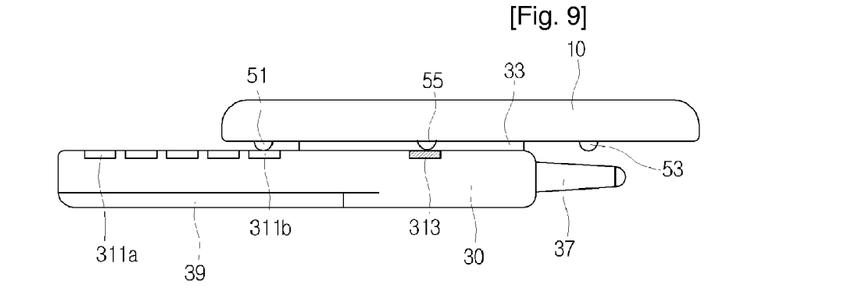
FIG. 9 is a schematic drawing illustrating the lower push protrusion and the middle push protrusion corresponding with the second open button and the hidden button, as the slide part is opened with respect to the main body in the slide type mobile terminal of FIG. 7.

Also, as shown in FIG. 9, when the slide part 10 is open, applying pressure on the lower end of the slide part 10 may make the lower push protrusion 51 apply pressure on the second open button 311b to execute function B, and applying pressure on the middle portion makes the middle push protrusion 55 apply pressure on the hidden button 313 to execute function C.

The first and second open buttons 311a, 311b may provide different functions depending on whether the slide part 10 is open or closed. The hidden button 313 may also provide different functions depending on whether the slide part 10 is open or closed.

Figure 10:
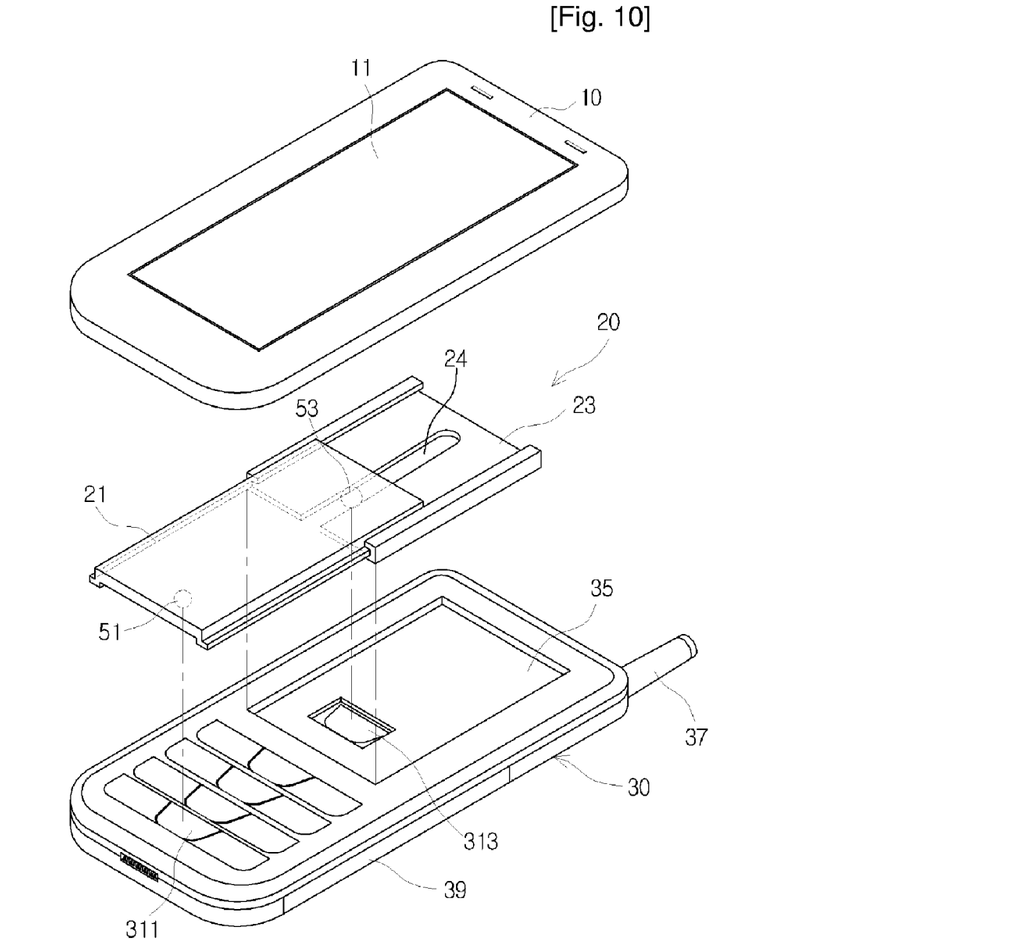
FIG. 10 is an exploded perspective view of a slide type mobile terminal using a slide hinge according to yet another embodiment of the present invention.

FIG. 10 is an exploded perspective view of a slide type mobile terminal using a slide hinge according to yet another embodiment of the present invention. The slide part 10 and main body 30 of the slide type mobile terminal illustrated in FIG. 10 join each other by means of a slide hinge 20.

The slide hinge 20 comprises a first hinge part 21 joined to the slide part 10, and a second hinge part 23 joined to the main body 30 and into which both ends of the first hinge part 21 are inserted slidably.

The first hinge part 21 is secured to the back face of the slide part 10 and moves with the slide part 10 up and down with respect to the second hinge part 23. When the slide part 10 is closed, a portion of the first hinge part 21 is positioned over the open button 311. Also, on the back face of the first hinge part 21 are formed upper and lower push protrusions 53, 51 (represented in dotted lines).

The second hinge part 23 joins the first hinge part 21 and plays the role of guiding the sliding motion of the first hinge part 21. The second hinge part 23 is secured to the main body groove 35 formed on a face of the main body 30. The second hinge part 23 comprises a slot 24 formed longitudinally. The slot 24 is a groove formed to prevent the upper push protrusion 53 from being caught on the second hinge part 23 during the sliding motion of the first hinge part 21. Hence, the slot 24 may take any shape, so long as it can hold the push protrusions 51, 53 rising in cooperation with the slide part 10.

The upper and lower push protrusions 53, 51 apply pressure on the hidden button 313 positioned on the main body groove 35 by the displacement provided at the joining portion between the first hinge part 21 and the second hinge part 23. The hidden button 313 is formed on the main body groove 35, and is pressed by the lower push protrusion 51 or the upper push protrusion 53 to execute a function. The vertical distance between the open button 311 and the hidden button 313 is equal to the distance between the upper push protrusion 53 and the lower push protrusion 51.

The first hinge part 21 and the second hinge part 23 are formed by a light metal or plastic, and displacement is made possible for the first hinge part 21 and the slide part 10 due to the elastic force of such light metal or plastic. Also, a molded element (not shown) typically made of plastic resin, etc., is positioned at the joining portion between the first hinge part 21 and the second hinge part 23. Such a molded element reduces noise during the movement of the first hinge part 21 as well as increasing the displacement of the first hinge part 21.

Figure 11:
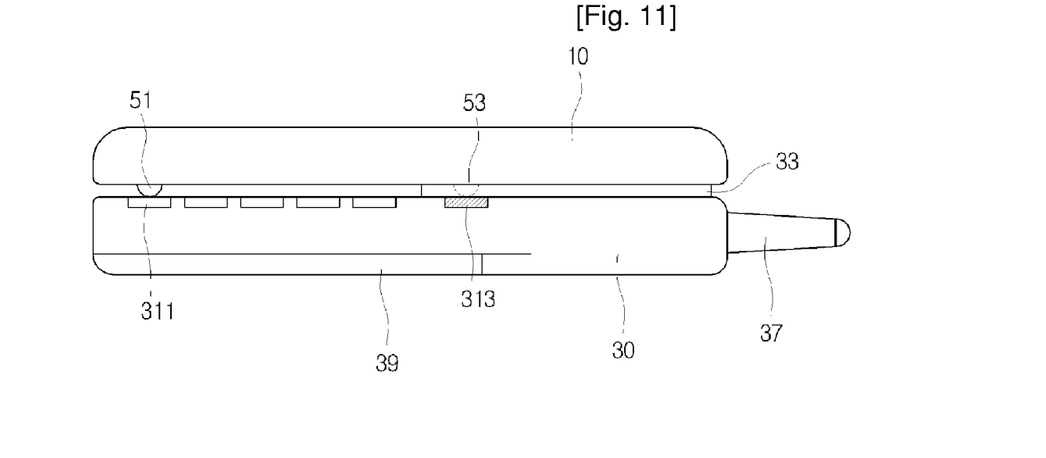
FIG. 11 is a schematic drawing illustrating a lower push protrusion and an upper push protrusion corresponding with an open button and a hidden button, when the slide part is closed with respect to the main body in the slide type mobile terminal of FIG. 10.
Figure 12:
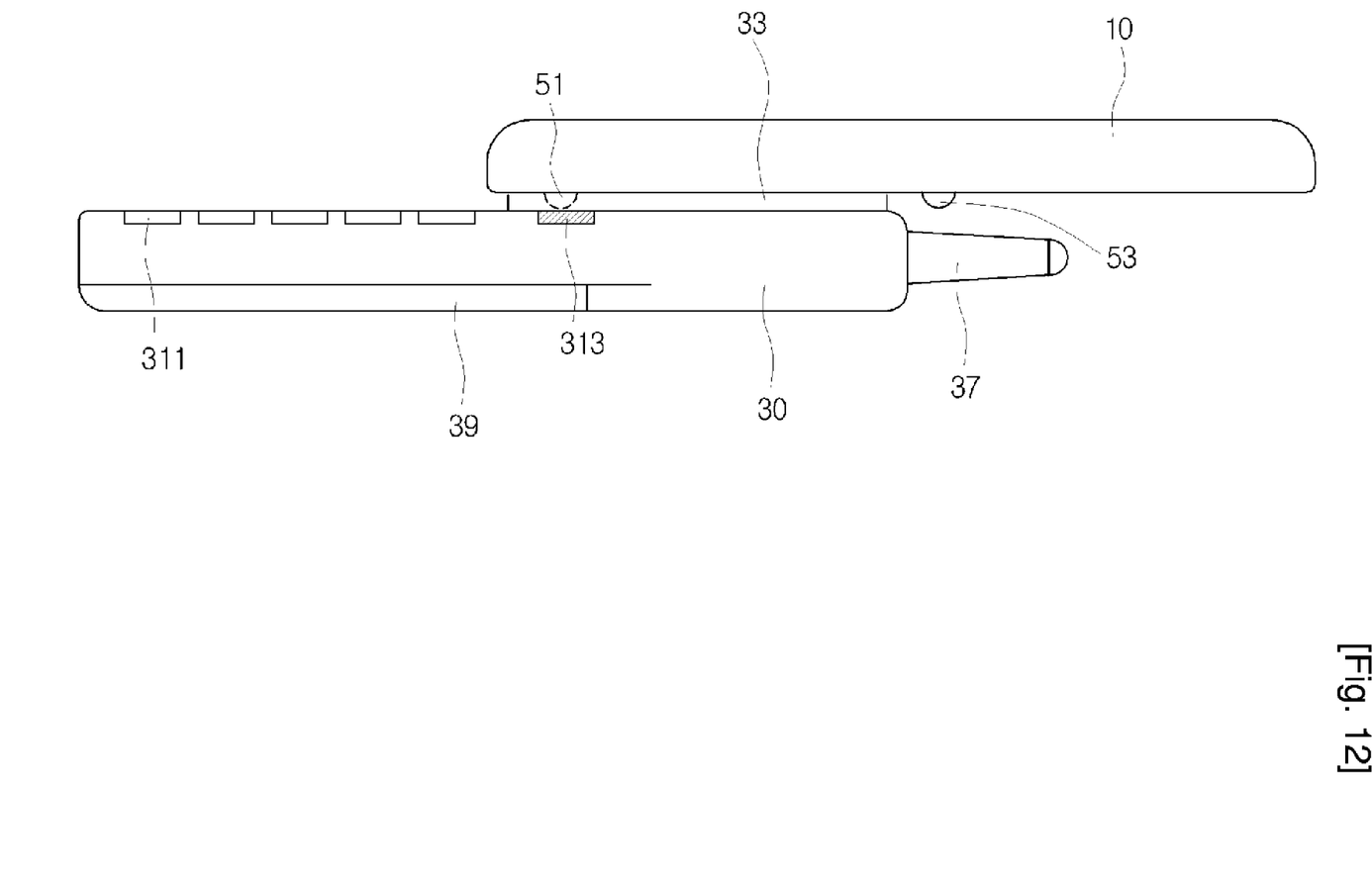
FIG. 12 is a schematic drawing illustrating the lower push protrusion corresponding with the hidden button, when the slide part is opened with respect to the main body in the slide type mobile terminal of FIG. 10.

FIG. 11 is a schematic drawing illustrating a lower push protrusion 51 and an upper push protrusion 53 corresponding with an open button 311 and a hidden button 313 when the slide part 10 is closed with respect to the main body 30 in the slide type mobile terminal of FIG. 10, and FIG. 12 is a schematic drawing illustrating the lower push protrusion 51 corresponding with the hidden button 313 when the slide part is opened with respect to the main body in the slide type mobile terminal of FIG. 10.

As shown in FIG. 11, when the slide part 10 is closed with respect to the main body 30, the lower push protrusion 51 and the upper push protrusion 53 correspond respectively with the open button 311 and the hidden button 313. Thus, applying pressure on the lower end of the slide part 10 makes the lower push protrusion 51 apply pressure on the open button 311 to execute function A, and pressing the middle portion makes the upper push protrusion 53 apply pressure on the hidden button 313 to execute function B.

Also, as shown in FIG. 12, when the slide part 10 is open with respect to the main body 30, applying pressure on the lower end of the slide part 10 makes the lower push protrusion 51 apply pressure on the hidden button 313 to execute function B. Of course, the hidden button 313 and the open button 311 may each provide different functions depending on whether the slide part 10 is open or closed.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

INDUSTRIAL APPLICABILITY

According to the present invention comprised as above mentioned, the invention can provide a slide type mobile terminal which has a bigger display and offers convenience of operation.

The present invention can also provide a slide type mobile terminal which has various functional buttons.

The invention claimed is:

1. A slide type mobile terminal, comprising:
a main body having buttons; and
a slide part having a display;
wherein the buttons comprise at least one open button that is open to an exterior and at least one hidden button that is not open to the exterior when the slide part is opened with respect to the main body;
the slide part comprises a plurality of push protrusions;
the main body and the slide part are joined by connecting structures which allow sliding of the slide part with respect to the main body;
the plurality of push protrusions comprises a first protrusion and a second protrusion corresponding respectively to the at least one open button and the at least one hidden button when the slide part is closed with respect to the main body;
the at least one open button has different functions depending on whether the slide part is open or closed with respect to the main body; and
the at least one hidden button has different functions depending on whether the slide part is open or closed with respect to the main body.

2. The slide type mobile terminal according to claim 1, wherein the at least one hidden button comprises a first hidden button and a second hidden button, and the plurality of push protrusions further comprises a third protrusion, the second protrusion and the third protrusion corresponding respectively to the first hidden button and the second when hidden button when the slide part is closed with respect to the main body.

3. The slide type mobile terminal according to claim 2, wherein the first protrusion corresponds with the first hidden button or the second hidden button when the slide part is open with respect to the main body.

4. The slide type mobile terminal according to claim 1, wherein the at least one open button comprises a first open button and a second open button, and the plurality of push protrusions further comprises a third protrusion, the first protrusion and the third protrusion corresponding respectively to the first open button and the second open button when the button slide part is closed with respect to the main body.

5. The slide type mobile terminal according to claim 4, wherein the first protrusion corresponds with the second open button when the slide part is open with respect to the main body.

6. The slide type mobile terminal according to claim 1, wherein the connecting structures comprise: at least one slide groove formed on one of the main body and the slide part; and at least one slide guide formed on the other of the main body and the slide part and inserted into the slide groove.

7. The slide type mobile terminal according to claim 1, wherein the connecting structures comprise: a first hinge part joined to one of the main body and the slide part; and a second hinge part joined to the other of the main body and the slide part and inserted slidably into the first hinge part.

8. The slide type mobile terminal according to claim 7, wherein the first hinge part is joined to a back face of the slide part, and the second hinge part is joined to the main body; and the first protrusion and the second protrusion are on a face of the first hinge part.

9. The slide type mobile terminal according to claim 8, wherein the first push protrusion corresponds with the at least one hidden button when the slide part is open with respect to the main body.

* * * * *